(12) United States Patent
Eckhard

(10) Patent No.: US 6,567,036 B1
(45) Date of Patent: May 20, 2003

(54) SEARCH DEVICE FOR LOCATING BURIED PERSONS

(76) Inventor: Christian Eckhard, Lodershamweg 1, D-85764 Oberschleissheim (DE)

(*) Notice: Subject to any disclaimer, the term of this patent is extended or adjusted under 35 U.S.C. 154(b) by 0 days.

(21) Appl. No.: 09/509,760

(22) PCT Filed: Jul. 30, 1999

(86) PCT No.: PCT/EP99/05524

§ 371 (c)(1), (2), (4) Date: Jun. 29, 2000

(87) PCT Pub. No.: WO00/08491

PCT Pub. Date: Feb. 17, 2000

(30) Foreign Application Priority Data

Jul. 31, 1998 (DE) .................................... 298 13 723 U

(51) Int. Cl.[7] ............................ G01V 3/17; A63B 29/02
(52) U.S. Cl. ......................................................... 342/22
(58) Field of Search ................................ 343/890, 891, 343/867, 702, 718, 788; 342/22

(56) References Cited

U.S. PATENT DOCUMENTS

| | | | |
|---|---|---|---|
| 3,806,936 A | | 4/1974 | Koster |
| 4,331,957 A | * | 5/1982 | Enander et al. ............... 342/22 |
| 5,038,151 A | * | 8/1991 | Kaminski .................... 343/890 |
| 5,955,982 A | * | 9/1999 | Moulin .......................... 342/22 |
| 6,031,482 A | * | 2/2000 | Lemaitr et al. ............... 342/22 |

FOREIGN PATENT DOCUMENTS

| | | |
|---|---|---|
| DE | 195 10 875 C1 | 9/1996 |
| EP | 0 855 600 A2 | 7/1998 |
| EP | 0 857 497 A1 | 8/1998 |
| GB | 1 577 742 | 10/1980 |

* cited by examiner

*Primary Examiner*—Ian J. Lobo
(74) *Attorney, Agent, or Firm*—Burns Doane Swecker & Mathis, L.L.P.

(57) ABSTRACT

The invention uses four antennae in order to pinpoint the exact position of the transmitter, especially at a close distance. The four antennae form two pairs of antennae placed at a specific angle to each other. The pairs of antennae are respectively comprised of two antennae that are also placed at a specific angle to each other. The pairs of antennae are respectively comprised of two antennae that are also placed at a specific angle to each other. The direction of the field line of the send antenna can be detected by comparing the signal intensities of the antenna pairs. Lateral deviations and forward or rear deviations from the shortest distance point can be recognised by comparing the signal intensities of the corresponding antennae. All signals have the same intensity at this point. Search devices are mainly used by wilderness skiers and those choosing to ski off piete.

3 Claims, 1 Drawing Sheet

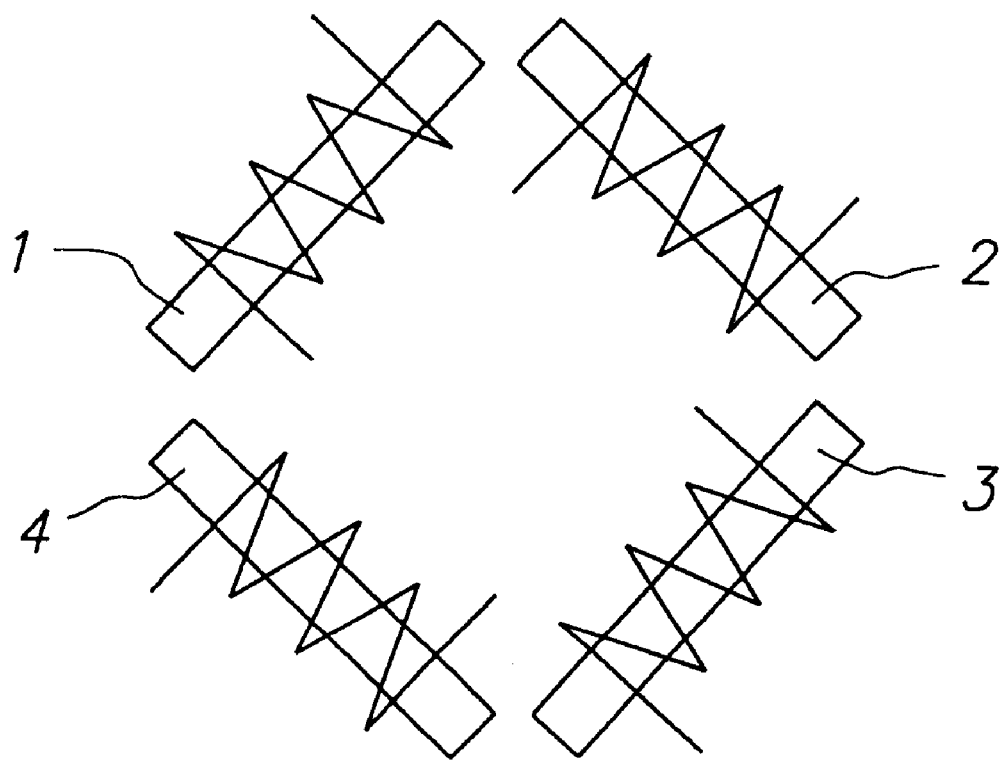

SEARCH DEVICE FOR LOCATING BURIED PERSONS

PRIOR ART

Search devices for locating buried persons based on transmitter and reception deices using a frequency of 457 kHz, especially for the search of persons buried by avalanches, have been in use for a longer period of time (compare patent DE 35 31 726 C1).

These devices suffer from a substantial disadvantage that is caused by the propagation of the electromagnetic field of their ferrite antenna (compare patent DE 193 10 875 C1) and the fact that the latter signal is only received by one antenna, i.e., only parallel orientation of the antennae leads to the detection of maximum signal strength given the closest distance to the transmitter. If a perpendicular orientation of the two antennae is given, several maximum signal strengths may occur, which are not in the closest distance to the transmitter. Concerning the search for buried persons the problem arises that the latter fact is taken into consideration by the application of time-consuming and highly complicated methods, which also require a substantial amount of training (compare "De Alpen" 11/1996—Mitteilungen des Schweizer Alpenclubs).

The invention disclosed in the patent DE 195 10 875 C1 also turns out to be less practical, because at first, there are three transmitter antennae located perpendicular to each other, which would render such a device very voluminous and make it impossible to wear it on the body, and second, a proper operation could only be ensured, if transmitter and receiver are of the same type, which excludes an integration into the already existing wide-spread types of devices. More recent devices, which make use of two perpendicular antennae (compare patent EP 0 855 600 A2), merely improve the first phase of the search for buried persons. An accurate localization to the point, however, cannot be achieved.

PROBLEM OF THE INVENTION

The invention is aimed at designing a search device for locating buried persons in a manner that allows the searcher to be guided easily and directly to the buried person, the latter being also possible with the above-mentioned wide-spread types of devices.

DESCRIPTION OF THE INVENTION

The invention makes use of two principles:
1. The induced voltage of a coil (=antenna) in a magnetic field is based on the following physical law:

$U = \mu_0 \, N \, H \, \Delta A$ $\Delta A = A \cos \alpha$

U: induced voltage $\mu_0$: induction constant

N: number of turns

H: field strength

A: coil plane perpendicular to the magnetic field $\alpha$: angle of the coil plane in relation to the perpendicular axis of the magnetic field From the latter it can be recognized that the induced voltage is dependent on the angle of the coil in relation to the magnetic field. Consequently, the direction of the magnetic field can be determined if one uses two coils which are present in a plane and are arranged in a certain angle, and compares the voltages thus induced.

As described in the patent DE 195 10 875 C1, the magnetic field of a transmitter antenna emanates from the latter in an elliptic manner. If the two reception coils, which are arranged in a certain angle with their longitudinal axes being each in parallel to the earth's surface, are always orientated in a manner that keeps both induced voltages equal, and one moves forward in the direction of the median keeping the orientation constant, one arrives at the transmitter coil along the so-called lines of electric flux.

However, the closer one gets to the transmitter coil, the more crucial the distance between the transmitter and the earth's surface plane becomes, as well as the distance between the earth's surface plane and the reception device.

2. From the patent DE 35 31 726 C2 it is known that the magnetic field strength is dependent upon the distance to the transmitter coil.

Hence, if two reception coils are arranged in a certain angle to each other and the longitudinal axis of the transmitter coil is oriented in parallel to the median of the reception coils, the reception coil which is closer to the transmitter coil will provide the higher induced voltage.

Consequently, a single transmitter coil may be localized accurately irrespective of its position in relation to the reception coils by means of two reception coils, which are arranged in a certain angle and two further reception coils which are also arranged in a certain angle and, at the same time, are arranged in a certain angle to the first pair of coils because only at the shortest distance to the transmitter coil, all four signals of the reception coils are equal and have the highest strength.

The transformation of the induced voltages of the reception coils into signal parameters is accomplished by an electronic circuit which is common for the latter purpose. The evaluation may be achieved in an analog manner, e.g., by means of several moving coil measuring devices with one of the latter indicating the tendency of the direction of the magnetic field by adding the signal strengths of the antennae 1(1) and 2(2) and indicating a left or right deflection depending on the negative or positive polarity sign, respectively, or adding the signal strengths of the antennae 1(1) and 3(3) and subsequently adding the latter to the sum of the antennae 2(2) and 4(4) and indicating a left or right deflection depending on the negative or positive polarity sign.

A further moving coil measuring device may be used in order to accomplish the indication of a lateral deviation within the short range by comparing the sums of the signals 1 and 4, as well as of the signals 2 and 3. By means of a third moving coil measuring device, the position of the buried person before or behind the searcher may be determined by comparing the sums of the signals 1 and 2, as well as of the signals 3 and 4.

However, it is much more convenient to convert the signals into digital data and subsequent calculation with a microprocessor. Then, the indication device may be a light emitting diode (LED) or a liquid crystal display.

In both cases, the signal is additionally rendered acoustically, i.e., with increasing loudness at increasing signal strengths in order to emphasize the approximation of the searcher to the buried person. Doing so, the amplification may be changed in a way that the change in loudness can be perceived more easily.

To be able to use the device as a transmitter, the reception coil is switched as transmitter coil which subsequently is able to broadcast signals of the standardized frequency of 457 kHz.

DESCRIPTION OF THE DRAWING

The included drawing shows a possible array of the four antennae, with the antennae 1(1) and 3(3) forming a pair of antennae as mentioned in the description, and the antennae 2(2) and 4(4) forming a pair as well.

What is claimed is:

1. A portable transmitter-receiver device for searching for and locating of persons buried by avalanches, said device comprising:

four antennae having main directions for transmission and reception, orientations of said main directions of said antennae being arranged in a plane, orientations of main direction of a first antenna and a second antenna of said four antennae being arranged transversely with respect to each other, orientations of main directions of a third antenna and a fourth antenna of said four antennae are arranged transversely with respect to each other, and orientations of main directions of said second antenna and said third antenna being arranged transversely with respect to each other;

a switch for switching said device between a transmission mode and a reception mode, wherein all said four antennae are operated as receiving antennae in said reception mode; and a comparison circuitry wherein said comparison circuitry is adapted to selectively compare a received signal strength of one of said four antennae with a received signal strength of each other of said four antenna in said reception mode.

2. The device according to claim 1, wherein one antenna is operated as a transmission antenna in said transmission mode.

3. The device according to claim 1, wherein at least one of said antennae is a helical antenna.

* * * * *